No. 639,654. Patented Dec. 19, 1899.
H. C. BENTON.
TRANSPLANTER.
(Application filed Feb. 4, 1899.)

(No Model.) 2 Sheets—Sheet 1.

Witnesses
J. M. Withrow
Chas. P. Broch

Inventor
H. C. Benton,
by
O'Meara & Co.
Attorneys

THE NORRIS PETERS CO., PHOTO-LITHO., WASHINGTON, D. C.

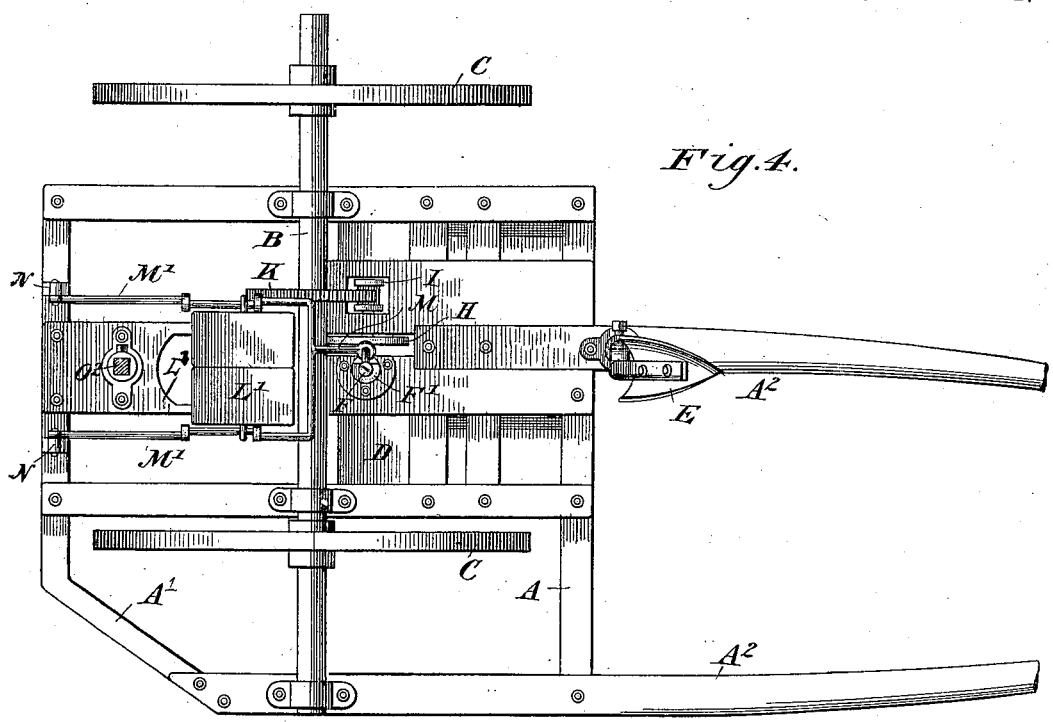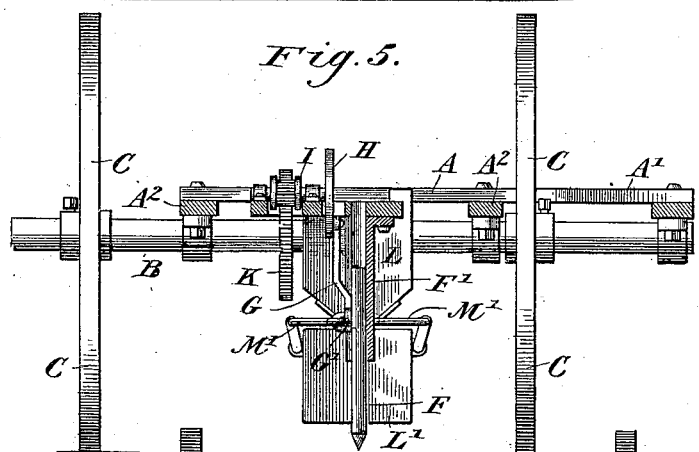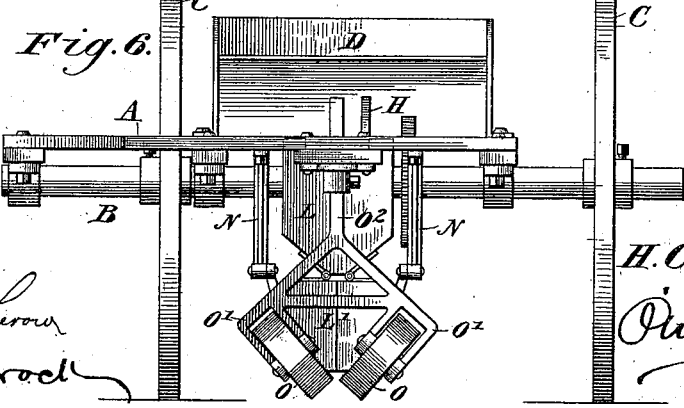

UNITED STATES PATENT OFFICE.

HEBER C. BENTON, OF SUNBURY, NORTH CAROLINA.

TRANSPLANTER.

SPECIFICATION forming part of Letters Patent No. 639,654, dated December 19, 1899.

Application filed February 4, 1899. Serial No. 704,526. (No model.)

*To all whom it may concern:*

Be it known that I, HEBER C. BENTON, a citizen of the United States, residing at Sunbury, in the county of Gates and State of North Carolina, have invented a new and useful Transplanter, of which the following is a specification.

This invention relates generally to planters, and more particularly to a transplanting apparatus intended for use in transplanting such plants as tobacco, cabbage, potatoes, &c., the object of the invention being to provide a simple and efficient means for cutting the furrow, boring the hole, setting the plant root downward, and then pressing the earth around the root or plant so set; and with this object in view the invention consists, essentially, of a main frame carrying a plunger operated from the wheel-axle, a plant-hopper divided longitudinally and adapted to be open at the bottom for the purpose of dropping the plant root downwardly, said bottom being operated also from the wheel-axle, and the covering-rollers arranged to the rear of the plant-hopper for the purpose of covering the plants.

The invention consists also in certain details of construction and novelties of combination, all of which will be fully described hereinafter and pointed out in the claims.

Figure 1:
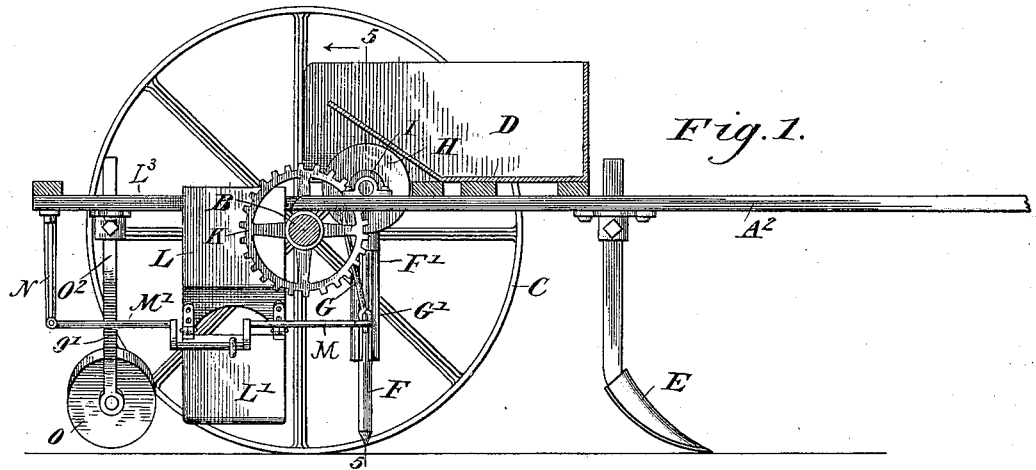
Figure 2:
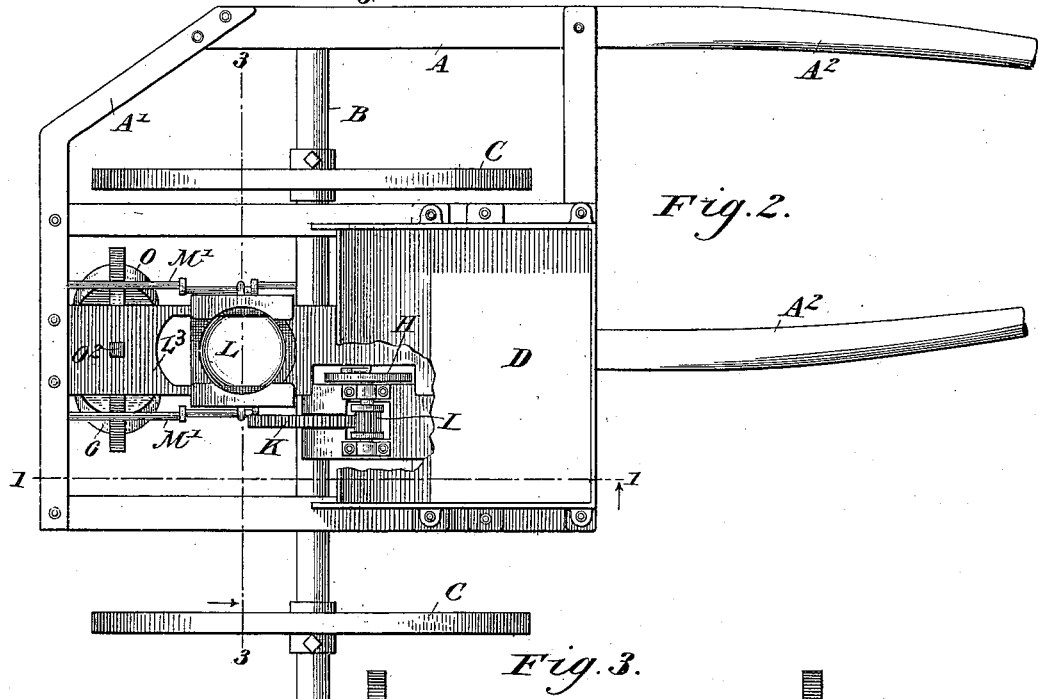
Figure 3:
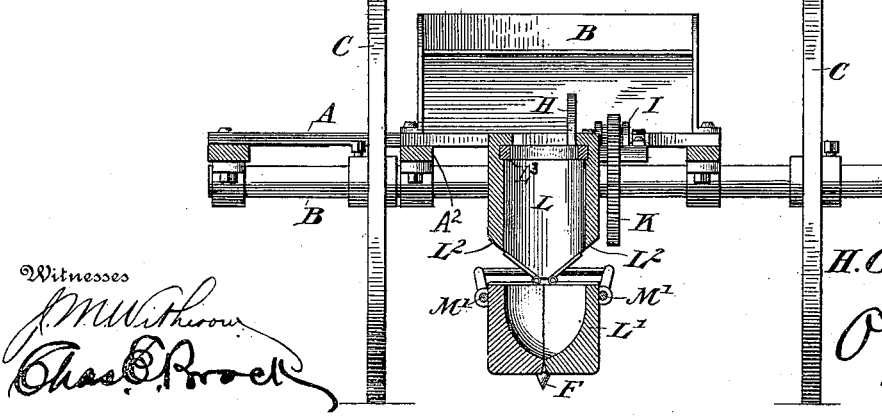

In the drawings forming part of this specification, Figure 1 is a longitudinal section on the line 1 1 of Fig. 2. Fig. 2 is a top plan view, a portion of the carrier-hopper being broken away. Fig. 3 is a transverse section on the line 3 3 of Fig. 2. Fig. 4 is a bottom plan view, the covering-wheels being omitted. Fig. 5 is a section on the line 5 5 of Fig. 1, and Fig. 6 is a rear elevation.

In carrying out my invention I employ a main frame A, which is mounted upon an axle B, supported upon ground-wheels C, and it will be noted that the main frame is provided with a lateral extension A' in order that the draft-thills A² may be arranged at one side of the longitudinal center of the main frame, the purpose of such arrangement being to enable the horse to walk along the side of the furrow instead of in the furrow.

A suitable box or receptacle D is mounted upon the forward portion of the main frame in which the plants to be set are carried, and I therefore designate said box or receptacle as the "carrying-hopper" in contradistinction to the "plant-hopper."

The furrow-opener or plow E is attached to the main frame, at the forward end thereof and along the longitudinal center, for the purpose of opening the earth and producing the furrow in which the plants are to be set, and in order to bore a hole to receive the root of the plant I employ a pivoted plunger F, which slides in a slotted guide F', depending from the main frame, said plunger being operated by a pitman G, connected to the plunger by means of an eye G', said pitman being connected to a crank-disk H, mounted upon a shaft journaled upon the main frame and driven by means of a pinion I, which meshes with and is driven by a large gear K, mounted upon the shaft B, so that as the planter is drawn forwardly the plunger will be caused to reciprocate in its guide, and upon each downstroke of said plunger a hole will be bored in the earth in the center of the furrow, and the depth of said hole can be regulated by the length of the stroke simply by changing the wrist-pin upon the crank-disk.

The plant to be set is selected by the driver from those carried in the hopper D and by him dropped into the planting-hopper L, which has a divided bottom L' hinged thereto, the sides of the upper portion L being cut away, as shown at L², in order that the hinged sections of the bottom may have room to swing upwardly when the said sections are divided for the purpose of dropping the plant, and in order to open the said sections at the proper time I employ an operating-rod M, which is connected to the plunger F and is bifurcated just in advance of the plant-hopper, each member thereof being cranked and pivotally connected to the sides of the sectional bottom, the rear ends of each member M' being pivotally connected to the lower ends of the depending brackets N. By means of this operating-rod, bifurcated in the manner described and pivotally connected at one end to the plunger and to the depending brackets at the other, the sectional bottom will be caused to divide or open upon each upstroke of the plunger, and inasmuch as the bottom is divided along the longitudinal central line of the planter it will be clearly seen how the plant dropped into the plant-hopper L will pass into the divided bottom, and as soon as the said bottom opens the plant will be deposited root downward into the hole bored by the plunger F. In order to cover the roots of the plant so deposited, I employ the covering-wheels O, which are journaled in brackets O', arranged at an angle, as shown, the brackets being arranged from the lower end of a bracket-standard $O^2$, which is adjustably connected to the rear portion of the main frame, and by arranging these wheels in this manner it will be seen that after the plant has been set the covering-wheels will press the earth tightly about the roots, and thus leave them in a perfectly secure position.

The planting-hopper L slides longitudinally upon the guide $L^3$, and by this means the distance between the plunger and the planting-hopper can be increased or decreased, as desired.

It will thus be seen that I provide an exceedingly simple and efficient construction of planter, which performs all of its various operations in an easy manner and from a single power-shaft, and it will also be noted that all of the parts so operate as to insure the deposit of the plant in the proper place.

Having thus fully described my invention, what I claim as new, and desire to secure by Letters Patent of the United States, is—

1. In a planter the combination with the main frame, of the planting-hopper, having a longitudinally-divided bottom hinged thereto, the operating-rod for opening and closing the said divided bottom, a guideway arranged on the main frame upon which the hopper is adapted to be adjusted, substantially as described.

2. In a planter, the combination with the main frame, of a planting-hopper thereon, a plunger adapted to bore a hole in the ground, a guideway arranged on said main frame on which the hopper is adapted to be longitudinally adjusted, a divided bottom hinged to said hopper and means for operating the bottom of said hopper and plunger alternately, substantially as described.

3. In a planter of the kind described, the combination with the main frame, of the planting-hopper having a longitudinally-divided bottom hinged thereto, the operating-rod for opening and closing the said divided bottom, and means connected with the axle for operating the said rod, substantially as shown and described.

4. In a planter of the kind described, the combination with the main frame, having the furrow-opener in the front thereof, a carrying-hopper and a planting-hopper, of a plunger adapted to bore a hole in the ground, a longitudinally-divided bottom hinged to the planting-hopper, the operating-rod connected to said divided bottom, and also to the plunger, and means for operating the said plunger and rod, substantially as shown and described.

5. In a planter of the kind described, the combination with the main frame having a furrow-opener, carrying-hopper and planting-hopper, of the axle having a gear mounted thereon, a pinion mounted upon the shaft and adapted to mesh with the gear, a crank-disk carried also by said shaft, a plunger adapted to reciprocate in a suitable guide and operated by a pitman connected to the crank-disk, the longitudinally-divided bottom hinged to the planting-hopper, the operating-rod pivotally connected to the said hinged bottom, and also to the plunger, and the covering-wheels arranged at an angle to each other and to the rear of the planting-hopper, substantially as and for the purpose described.

HEBER C. BENTON.

Witnesses:
T. A. JORDAN,
JOS. M. CROSS.